I. KITSEE.
ELECTRIC TRANSMISSION OF INTELLIGENCE.
APPLICATION FILED JULY 3, 1911.

1,015,494.

Patented Jan. 23, 1912.

3 SHEETS—SHEET 3.

WITNESSES:
Edith R. Stiles
Mary E. Donath

INVENTOR.
Isidor Kitsee

UNITED STATES PATENT OFFICE.

ISIDOR KITSEE, OF PHILADELPHIA, PENNSYLVANIA.

ELECTRIC TRANSMISSION OF INTELLIGENCE.

1,015,494.  Specification of Letters Patent.  Patented Jan. 23, 1912.

Application filed July 3, 1911. Serial No. 636,680.

*To all whom it may concern:*

Be it known that I, ISIDOR KITSEE, a citizen of the United States, residing at Philadelphia, in the county of Philadelphia and State of Pennsylvania, have invented certain new and useful Improvements in Electric Transmission of Intelligence, of which the following is a specification.

My invention relates to an improvement in electric transmission of intelligence. Its object to neutralize the inducing effect of one circuit upon the other.

My invention is applicable to aerial lines as well as cables, but its great advantage is more apparent in systems wherein a number of circuits are provided with one common sheath, such as aerial, underground or submarine cables.

To illustrate some of the forms my invention may take, I have recourse to the accompanying drawings.

Figure 1:
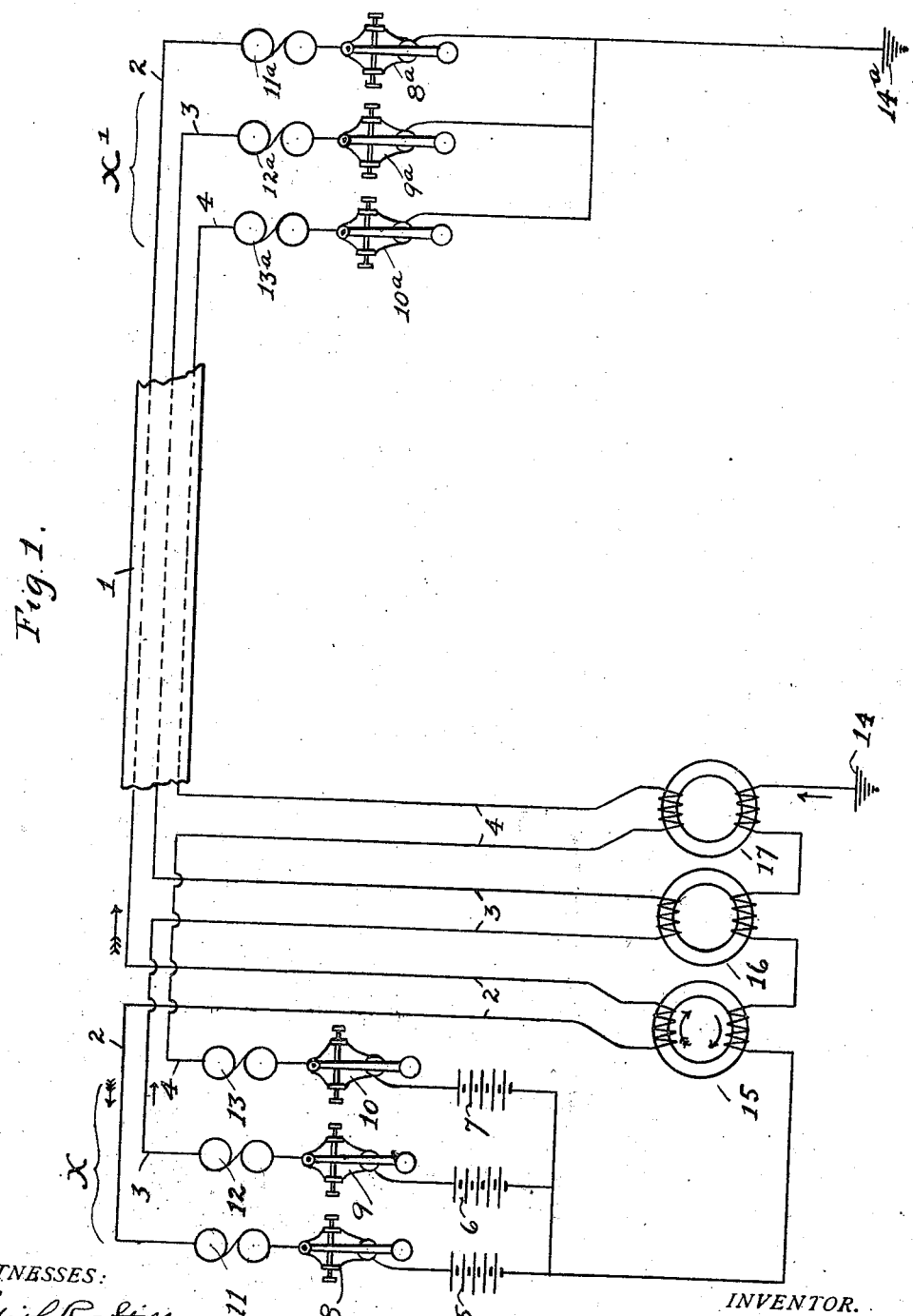
Figure 2:
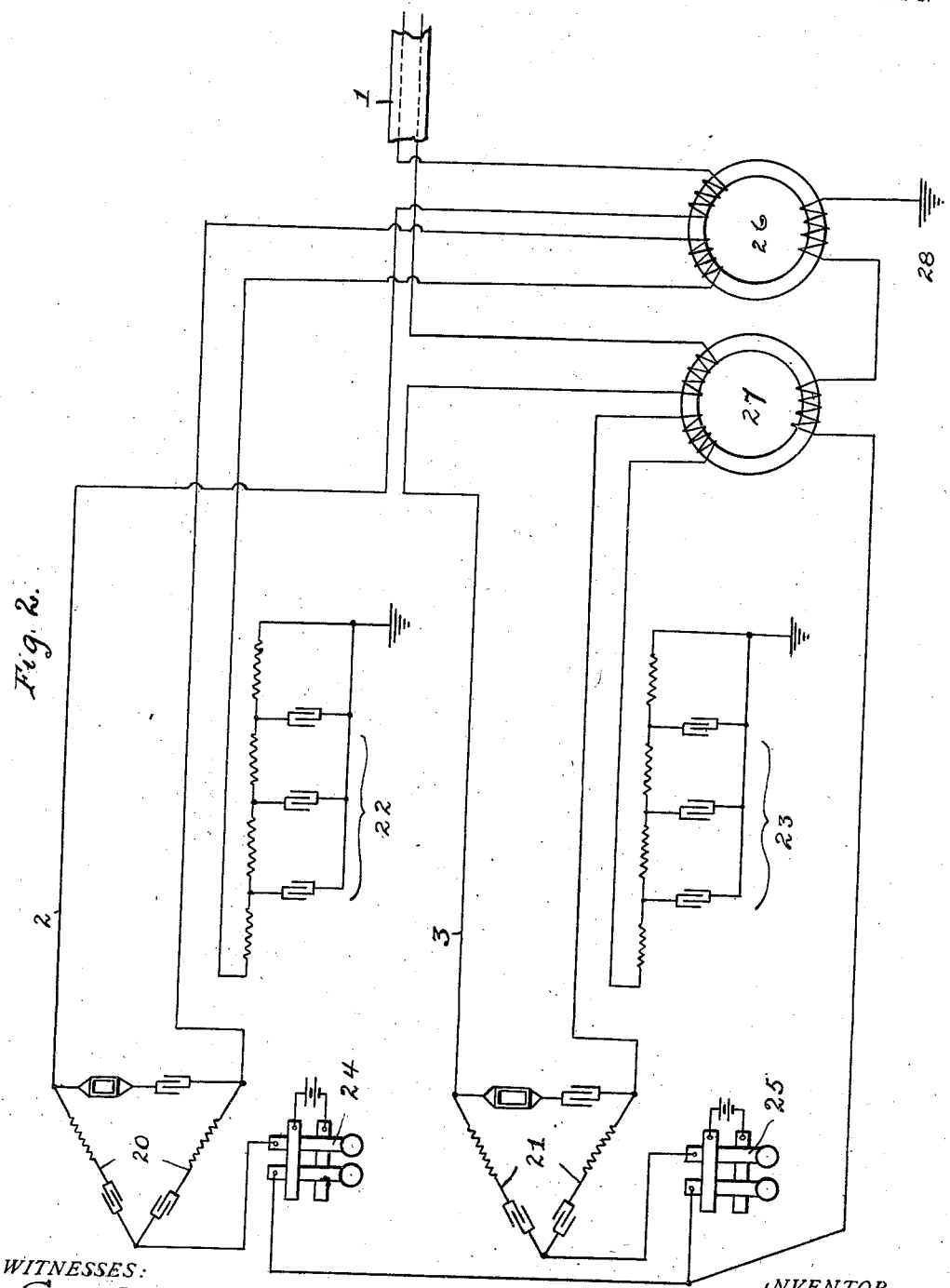
Figure 3:
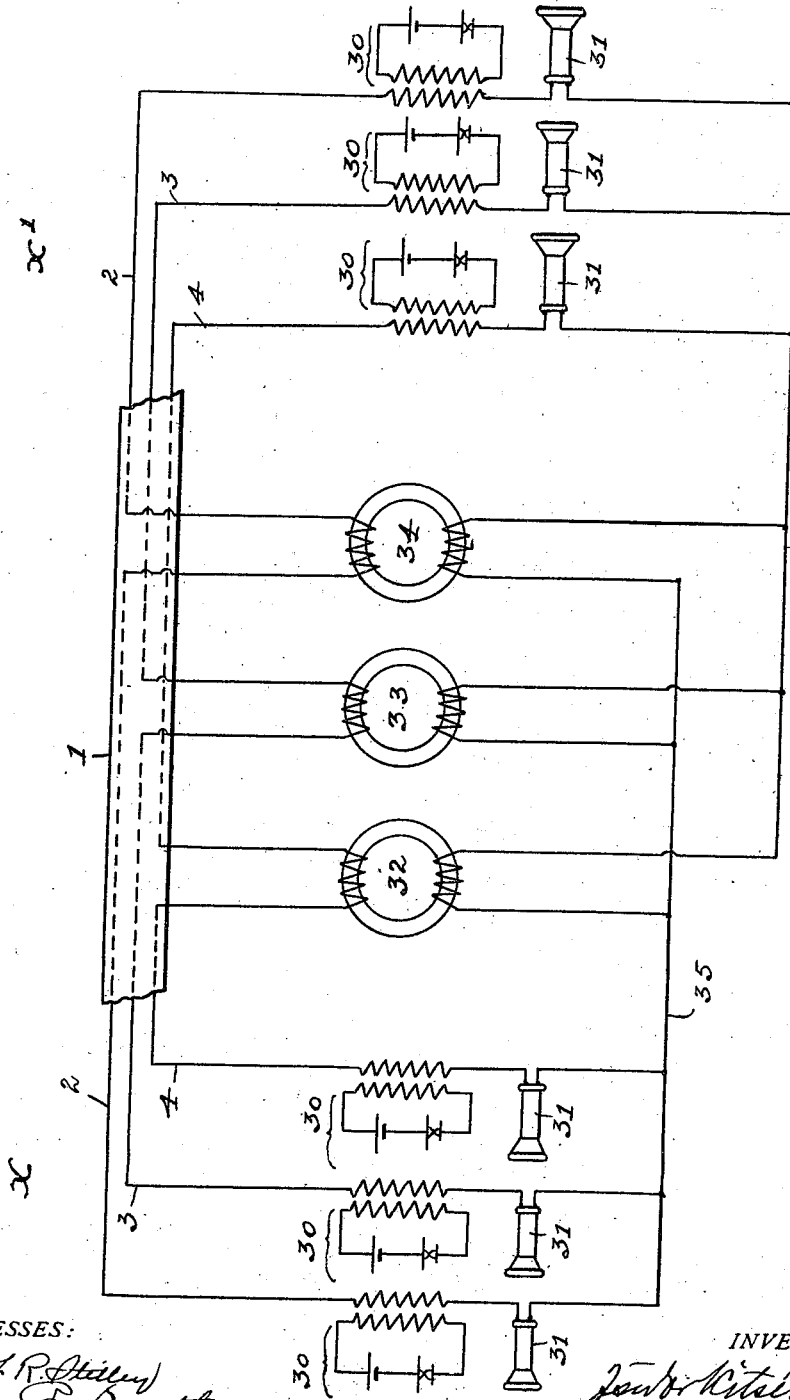

In these drawings, Figure 1 is a diagrammatic view of a cable, such as is used for aerial or underground purposes, the different telegraphic lines inclosed in the cable grounded and provided with my invention. Fig. 2 is a diagrammatic view of a submarine cable, the different telegraphic lines inclosed in said cable grounded and provided with my invention. Fig. 3 is a diagrammatic view of a cable, the different telephonic lines inclosed in said cable provided with one common metallic return and provided with my invention.

In Fig. 1, 1 is the cable, the common sheath being for better understanding broken away at both terminals; 2, 3, 4, are the respective lines in this cable; 5, 6, 7, the batteries at station X of the cable; 8, 9, 10, the transmitting keys at the same station; 11, 12, 13, the receivers at this station. The keys, and receivers at the station X' are numbered alike with the exception that the numbers carry the designation *a*.

14 is the common ground connection for one terminal of the line and 14ᵃ the ground connection for the second terminal of the line.

Each line is provided with my anti-induction device comprising an iron core, a helix or coil connected to the line to be protected and a second helix or coil inserted in the common ground circuit. The inductive devices are designated respectively by the numerals 15, 16, 17.

I will describe here the function of one of these anti-induction devices, it being understood that the function of the remaining devices are similar, and I take as such example the device 15, one helix of which is connected to the line 2. When all keys are at rest, the flow of current through the lines will be a constant and steady one and, therefore, no inductive influence will take place from one line to the other. But let us suppose that the operator at station X of the line 3 desires to transmit a message and, therefore, operates his key in the usual manner, transmitting a short impulse to denote a dot and a longer impulse to denote a dash. The variation of this current-flow will induce pulses in the neighboring wire 2 and these impulses will flow in the opposite direction from the flow of the current in line 3. As the battery 6 connected to line 3 indicates, the flow of the current when the key is closed will be in the direction of the unfeathered short arrow and the inductive impulse due to the flow of this current will be in the line 2 in the direction of the short feathered arrow. But at the same time that this impulse is induced in line 2, the current will flow in the coil connected to the common ground of the device 15 in the direction of the long unfeathered arrow and will induce a current impulse in the coil of this device connected to line 2 in the direction of the long feathered arrow, *i. e.* in a direction opposite to the direction of the induced impulse denoted by the short feathered arrow. The ceasing of the flow of the current through wire 3 will induce in the wire 2 an impulse opposite to the former induced impulse and so will the ceasing of the flow of the current in the coil of the device 15 induce a pulse in the second coil of said device also in opposition to the first impulse. It is thereby seen that if the coils are carefully adjusted as to their inducing properties, the device 15 can be so arranged that the impulse induced through the flow of the current in the line 3 can be entirely compensated or neutralized.

In Fig. 2, which represents one part of a duplexing system of two submarine lines of transmission; 1 is the cable; 2, 3, the lines of transmission; 20 the duplexing bridge of line 2; 21 the duplexing bridge of line 3; 22 the artificial line of line 2 and 23 the artificial line of line 3. 24 is the transmitting arrangement as now used for line 2 and 25 the transmitting arrangement for line 3. 26 is the anti-inductive device for line 2 and 27 the anti-inductive device for line 3. 28 is the common ground connection. In this figure, only two transmitting lines are shown, but as in all lines with great capacity arranged for duplexing work, the lines are here shown as to be provided with the usual artificial cable, and a neutralizing coil is provided for the real line as well as the artificial line. The function of the coil connected to the common ground is the same as the function of the coil described in Fig. 1.

In Fig. 3; 1 is the cable; 2, 3, 4, the lines of transmission, each of the two terminals of each line being provided with a telephonic transmitting device 30 and a receiving device 31. All three lines are connected to the common metallic return 35. The neutralizing coils are connected in multiple arc as to each other and return. The function of these devices is the same as the function of the devices as described in Fig. 1, and they are designated respectively by the numerals 32, 33 and 34.

I have illustrated in this figure each telephonic circuit as being provided with its individual battery and placed the receiver directly in the line, but it is obvious that each of the telephonic circuits may be so connected and provided with such devices as to make out of these circuits a common trunk line.

Having now described my invention, what I claim as new and desire to secure by Letters Patent is:—

1. In combination with an electric cable comprising a number of lines of transmission, means to neutralize the inducing effect of one line upon the other line, said means comprising a magnetic core for each of said lines, a coil for each of said cores connected to the lines to be neutralized, a second coil for each of said cores, said second coil connected in the common return of the lines inclosed in said cable.

2. In combination with a number of neighboring lines of transmission inclosed in a cable, a separate and individual anti-inductive device for each of said lines, each of said anti-inductive devices comprising a separate iron core, one coil of said core connected in the line and the second coil of said core connected in the common return.

3. In combination with a series of neighboring lines of transmission inclosed in a cable, a common return for all of said lines, each of said lines provided with a separate anti-inductive device, each of these devices comprising an individual core, one coil thereof connected to one of the lines of transmission and the second coil thereof connected in the common return.

4. In combination with a cable including two or more lines of transmission, each line provided with an artificial line, means to neutralize the inductive effect of one line upon the other, said means comprising for each line a magnetic core and a series of coils for said core, one coil connected to the line of transmission, one coil connected to the artificial line and one coil connected to the common return.

5. Means to neutralize the inductive effect of one line of transmission upon the other line of transmission, said means comprising a common ground for said lines, an inductive device for each of the lines to be neutralized and each of said devices comprising a closed magnetic circuit and two coils therefor, one coil connected to the line to be neutralized and the other coil connected in the common ground.

6. Means to neutralize the inductive effect of neighboring lines of transmission, said means comprising an inductive device, one coil connected to one pole of the source of current and line of transmission to be neutralized, respectively, the second coil connected to the opposite pole of the source of current and common return.

7. Means to neutralize the inductive effect of neighboring lines of transmission provided each with an artificial line, said means comprising an inductive device, three coils for said device, one of said coils connected to the line to be neutralized, the second coil connected to its artificial line and the third coil connected to the common return.

In testimony whereof I affix my signature in presence of two witnesses.

ISIDOR KITSEE.

Witnesses:
EDITH R. STILLEY,
MARY R. SMITH.

---

Copies of this patent may be obtained for five cents each, by addressing the "Commissioner of Patents, Washington, D. C."